(12) United States Patent
Wang et al.

(10) Patent No.: US 11,941,532 B2
(45) Date of Patent: Mar. 26, 2024

(54) METHOD FOR ADAPTING DEEP LEARNING FRAMEWORK TO HARDWARE DEVICE BASED ON UNIFIED BACKEND ENGINE

(71) Applicant: ZHEJIANG LAB, Zhejiang (CN)

(72) Inventors: Hongsheng Wang, Hangzhou (CN); Wei Hua, Hangzhou (CN); Hujun Bao, Hangzhou (CN); Fei Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 136 days.

(21) Appl. No.: 17/726,563

(22) Filed: Apr. 22, 2022

(65) Prior Publication Data
US 2023/0162048 A1 May 25, 2023

(30) Foreign Application Priority Data
Nov. 25, 2021 (CN) .......................... 202111408005.4

(51) Int. Cl.
*G06N 3/10* (2006.01)
*G06N 3/04* (2023.01)

(52) U.S. Cl.
CPC ................. *G06N 3/10* (2013.01); *G06N 3/04* (2013.01)

(58) Field of Classification Search
CPC ..................................... G06N 3/10; G06N 3/04
See application file for complete search history.

(56) References Cited

U.S. PATENT DOCUMENTS

| 10,614,156 B1 | 4/2020 | Stansell et al. | |
| 2020/0250585 A1* | 8/2020 | Liu | G06N 20/00 |
| 2022/0292390 A1* | 9/2022 | Cao | G06N 20/00 |

FOREIGN PATENT DOCUMENTS

| CN | 107145343 A | 9/2017 |
| CN | 111897585 A | 11/2020 |

OTHER PUBLICATIONS

Chen et al., "TVM: End-to-End Optimization Stack for Deep Learning," in 11 arXiv preprint arXiv:1802.04799 20 (2018). (Year: 2018).*
Cyphers et al., "Intel® nGraph(TM): An Intermediate Representation Compiler, and Executor for Deep Learning," in arXiv preprint arXiv:1801.08058 (2018) (Year: 2018).*

(Continued)

*Primary Examiner* — Ryan C Vaughn
(74) *Attorney, Agent, or Firm* — W&G Law Group (57) ABSTRACT

Disclosed is a method for adapting a deep learning framework to a hardware device based on a unified backend engine, which comprises the following steps: S1, adding the unified backend engine to the deep learning framework; S2, adding the unified backend engine to the hardware device; S3, converting a computational graph, wherein the computational graph compiled and generated by the deep learning framework is converted into an intermediate representation of the unified backend engine; S4, compiling the intermediate representation, wherein the unified backend engine compiles the intermediate representation on the hardware device to generate an executable object; S5, running the executable object, wherein the deep learning framework runs the executable object on the hardware device; S6: managing memory of the unified backend engine.

9 Claims, 4 Drawing Sheets (56) References Cited

OTHER PUBLICATIONS

Jain et al., "Efficient Execution of Quantized Deep Learning Models: A Compiler Approach," in arXiv preprint arXiv:2006.10226 (2020). (Year: 2020).*
Li et al., "The Deep Learning Compiler: A Comprehensive Survey," in 32.3 IEEE Transactions on Parallel and Distributed Sys. 708-27 (2021). (Year: 2021).*
CN First Office Action(202111408005.4); dated Jan. 5, 2022.

* cited by examiner

Single operator test

| Batch / Hardware | Convolution operator forward | | Convolution operator reverse | |
| --- | --- | --- | --- | --- |
| | DTU | GPU | DTU | GPU |
| 4 | 0.215 | 0.219 | 0.269 | 0.273 |
| 8 | 0.272 | 0.281 | 2.425 | 2.456 |
| 16 | 0.375 | 0.384 | 2.891 | 2.931 |
| 32 | 0.588 | 0.612 | 3.662 | 3.721 |
| 64 | 1.024 | 1.031 | 4.403 | 4.352 |
| 128 | 8.205 | 8.213 | 11.991 | 12.023 |

Unit: second

FIG. 4

METHOD FOR ADAPTING DEEP LEARNING FRAMEWORK TO HARDWARE DEVICE BASED ON UNIFIED BACKEND ENGINE

CROSS-REFERENCE TO RELATED APPLICATIONS

The present application claims priority to Chinese Application No. 202111408005.4, filed on Nov. 25, 2021, the contents of both of which are incorporated herein by reference in their entireties.

TECHNICAL FIELD

The present disclosure relates to the technical field of artificial intelligence and domestic AI chips, in particular to a method for adapting a deep learning framework to a hardware device based on a unified backend engine.

BACKGROUND

There is still a certain gap between domestic AI chips and international mainstream brands. Mainly domestic chips have weak computing performance and poor adaptability. With China's strong support for the field of integrated circuits, Huawei, Baidu, MEGVII, etc. have all opened up the domestic AI framework, and Cambricon, iluvatar CoreX, Enflame Technology, etc. have all independently developed a number of domestic AI chips. However, the domestic adaptation is still in the initial stage, which is not conducive to the promotion and construction of domestic self-controlled equipment. It has become a major issue to be solved urgently in this field that the mainstream deep learning framework can build domestic AI chips, improve the computing power of domestic machines, provide model algorithms for different intelligent application scenarios, and promote the application promotion and development of domestic basic platforms. To achieve the above objectives, this field is faced with a realistic technical problem: how to solve the incompatibility problem between commercial AI cards and domestic deep learning frameworks.

SUMMARY

The purpose of the present disclosure is to provide a method for adapting a deep learning framework to a hardware device based on a unified backend engine to overcome the shortcomings in the prior art.

To achieve the above objectives, the present disclosure provides the following technical solutions:

the present disclosure discloses a method for adapting a deep learning framework to a hardware device based on a unified backend engine, including the following steps:

S1, adding the unified backend engine to the deep learning framework;

S2, adding the unified backend engine to the hardware device;

S3, converting a computational graph, the computational graph compiled and generated by the deep learning framework is converted into an intermediate representation of the unified backend engine;

S4, compiling the intermediate representation, the unified backend engine compiles the intermediate representation on the hardware device to generate an executable object;

S5, running the executable object, the deep learning framework runs the executable object on the hardware device;

S6: managing memory of the unified backend engine.

The step S1 includes the following substeps:

S11: the hardware device is registered in the deep learning framework, a device field corresponding to the hardware device is added to the source code of the deep learning framework, an enumeration type of a device type is created for the hardware targeted by the unified backend engine, and the device field corresponding is added to the hardware in the device type;

S12: the unified backend engine is registered in the deep learning framework and a unified backend engine field is added to the deep learning framework;

S13: a compiler of the unified backend engine is added to the deep learning framework;

S14: the compiler of the unified backend engine is registered in the deep learning framework, and the newly added compiler is registered in the unified backend engine;

S15: a computational graph executable object of the unified backend engine is added to the deep learning framework, a corresponding computational graph executable object is added to the unified backend engine, and a running interface is realized.

The step S2 includes the following substeps:

S21: the compiler of the unified backend engine to the hardware device, adding the unified backend engine to the hardware device, and adding the compiler of the unified backend engine to a basic software library corresponding to the hardware device;

S22: the hardware device registering the compiler of the unified backend engine;

S23: adding the executable object of the unified backend engine to the hardware device.

The step S3 includes the following substeps:

S31: creating a graph launcher of the unified backend engine, and adding the graph launcher of the unified backend engine to the deep learning framework, the graph launcher inherits from computational graph operators of the framework and realizes a forward propagation interface, when the graph computation enters a runtime stage, the framework selects a route compiled and run by the unified backend engine when starting to run a kernel function of each operator in the computational graph by a runner;

S32: registering the graph launcher of the unified backend engine, and using the graph launcher to receive the calculated graph compiled and generated by the framework, which includes the following substeps:

S321: creating a global static dictionary, a key value is an element of an enumeration type, listing all optional graph launcher variables, a value value is the realization of the specific graph launcher;

S322: adding enumeration members of the graph launcher of the unified backend engine to a key value list of the enumeration type;

S323: transmitting a key value of the graph launcher of the unified backend engine by means of a front end of the framework transmitting to a registry by using the unified backend engine, and a graph executor of the framework itself choosing to use a corresponding value value of the graph launcher of the unified backend engine to start a graph computation process;

S33: converting the computational graph into the intermediate representation of the unified backend engine, which includes the following substeps:

S331: the graph executor of the framework loads a computational graph of the framework into the backend engine through the graph launcher of the unified backend engine and executes the forward propagation interface when the graph computation enters a running period;

S332: a computational graph conversion interface is created in the forward propagation interface, the computational graph conversion interface is responsible for converting the computational graph of the framework into the intermediate representation of the unified backend engine;

S333: the computational graph conversion interface first traverses all nodes according to a topological order of the computational graph of the framework, then creates the corresponding intermediate representation of the unified backend engine for the operators in each node, and finally, performs the computational graph conversion of the kernel function of each operator to generate the intermediate representation of the unified backend engine;

The step S4 includes the following substeps:

S41: converting the computational graph of the framework into the intermediate representation of the unified backend engine, and adding a compilation interface for compiling the intermediate representation to a compilation interface of the compiler of the unified backend engine at the framework end, and the compilation interface inputting the intermediate representation;

S42: the compiler of the unified backend engine at the framework end transmitting the intermediate representation to a running backend interface of the compiler of the unified backend engine at the hardware device end through the compilation interface;

S43: the compiler of the unified backend engine compiling the intermediate representation in the running backend interface to generate the executable object.

The step of the deep learning framework running the executable object on the hardware device in the step S5 is as follows: an executor of the unified backend engine on the hardware device receiving the executable object generated by the compiler of the unified backend engine, then running the executable object by the executor, and outputting a result of graph computation.

The specific steps of memory distribution in the step S6 are as follows:

S61: creating a memory distributor for distributing a memory for the unified backend engine at the framework end, and adding an interface for filling the memory, the memory distributor is responsible for constructing the memory required by the backend engine at the framework end and transmitting the memory to the unified backend engine;

S62: applying the memory of the memory distributor at the framework end according to a memory order required by the backend engine, and the interface of the memory distributor for filling the memory copying the memory of the unified backend engine to the framework end according to the original memory order when the hardware device finishes running, so as to realize one-to-one mapping between the memory order applied by the framework for the unified backend engine and memory order of the unified backend engine.

In order to enable the computational graph generated by the deep learning framework to be compiled and run on the specified hardware device registered by the unified backend engine through its own device field object, the unified backend engine must acquire the hardware specified by a user at a front end of the framework through the deep learning framework by way of constructing a dictionary in which a hardware type object specified by the user at the front end of the framework and a device ID field object of the unified backend engine are mapped one by one.

In the step S13, the compiler of the unified backend engine adopted a traditional compiler route in the related art, and the compiler of the unified backend engine inherits from the traditional compilers and realizes a corresponding compilation interface; an input of the compiler of the unified backend engine is the computational graph of the framework itself, each node in a subgraph is traversed in a topological order, and a node of the computational graph is sequentially compiled into a specific executable object to be output as the executable object of the unified backend engine. In some embodiments, the traditional compilers are unified compilers, and the unified compilers may adopt low level virtual machine (LLVM) compilers.

In order to handle different types of operators conveniently, the compilation process of the compiler of the unified backend engine is as follows: constructing two data structure types, namely, an operator context information type of the unified backend engine and a kernel function type of the operator of the unified backend engine, which specifically includes the two following processes:

compiling a single operator: the kernel function type of the operator of the unified backend engine is the kernel function type of the operator inherited from the framework itself, the compilation process of a single operator is completed according to the operator type, the kernel function of the operator of the unified backend engine is compiled to generate function codes, intermediate caches, and parameters corresponding to the input and output of the function codes, the kernel function type of the operator is registered in a kernel function factory of a corresponding operator to the unified backend engine, and a factory registration mode is adopted so that the backend engine can judge whether the engine supports a certain type of operator when dividing subgraphs;

storing meta-information and compilation results: the operator context information type of the unified backend engine temporarily stores meta-information and compilation results required by compilation, and provides necessary interfaces for the kernel function type of the operator, the operator context information type accepts two inputs, namely, currently computational graph nodes and all created parameters, and fills the function codes, intermediate caches, and the parameters corresponding to the input and output of the function codes generated by compiling the kernel function type of the operator into corresponding member variables of the operator context information type.

The present disclosure has the following beneficial effects: according to the method for adapting a deep learning framework to a hardware device based on the unified backend engine, considering that the unified backend engine is used to interface with the source code of the deep learning framework with the underlying software of the hardware device, a computational graph of the framework is converted into an intermediate representation of the unified backend engine, the intermediate representation can be directly compiled into an executable code of a target platform by the unified backend engine and can be directly executed without the participation of code of the framework itself during the runtime. According to the present disclosure, the deep learning framework and hardware devices are opened up, the source code of the deep learning framework fully interfaces with the bottom software of the chip, the hardware capability of the chip is released as much as possible, and strong computing power is provided for the end-side AI.

The features and advantages of the present disclosure will be described in detail through examples with reference to the attached drawings.

DESCRIPTION OF EMBODIMENTS

In order to make the purpose, technical solution and advantages of the present disclosure clearer, the present disclosure will be further explained in detail by the accompanying drawings and examples. However, it should be understood that the specific embodiments described here are only for explaining the present disclosure and are not intended to limit the scope of the present disclosure. Furthermore, in the following description, descriptions of well-known structures and technologies are omitted to avoid unnecessarily confusing the concepts of the present disclosure.

Example 1

Figure 1:
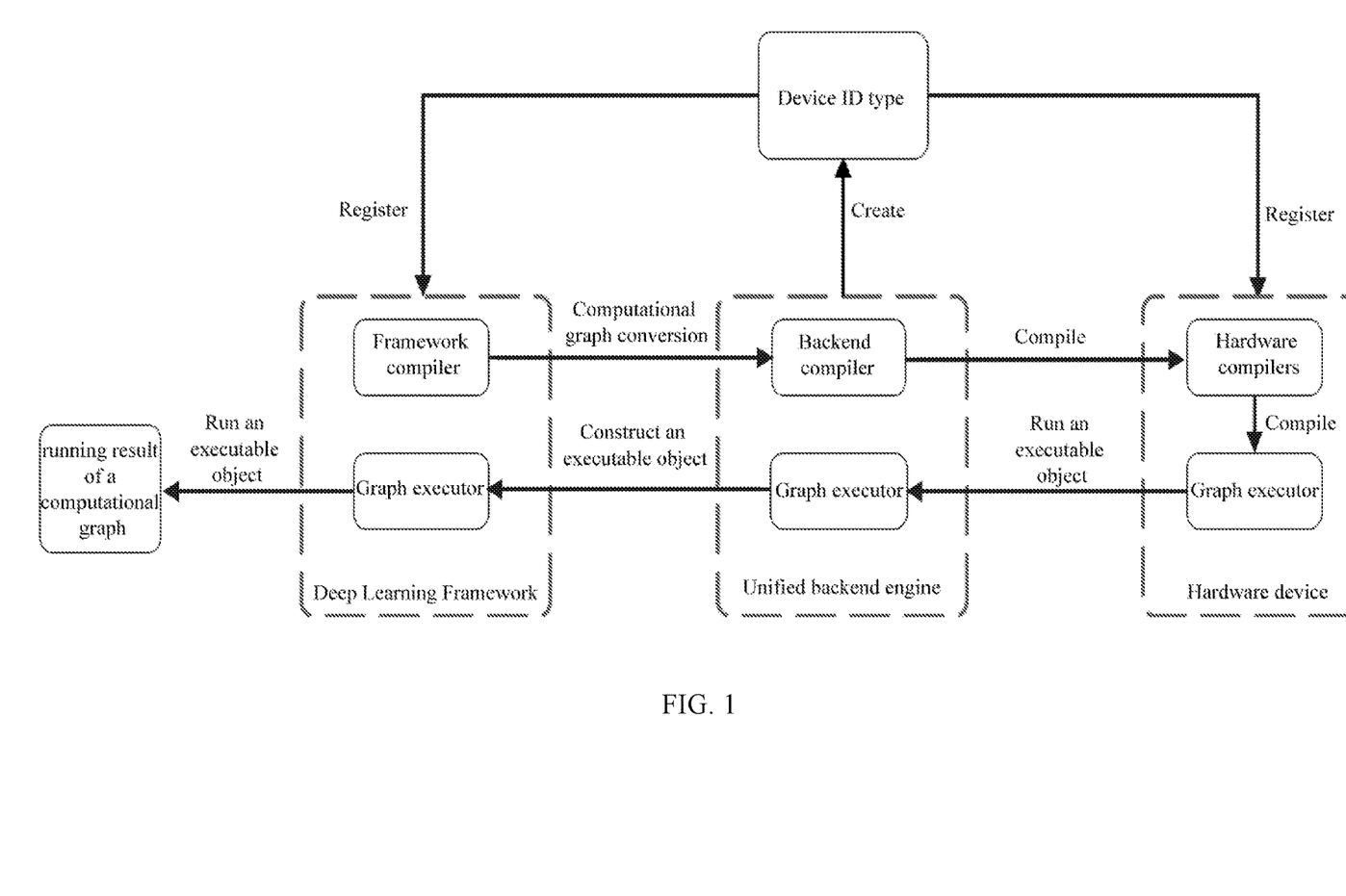
FIG. 1 is an architecture diagram of a deep learning framework based on a unified backend engine and a hardware device adaptation method.

As shown in FIG. 1, it shows the architecture diagram of a method for adapting a deep learning framework to a hardware device based on a unified backend engine.

The present disclosure provides a method for adapting a deep learning framework to a hardware devices based on a unified backend engine. The whole process is divided into six steps, specifically including the following steps:

The First Step: Adding a Unified Backend Engine to a Deep Learning Framework

Figure 2:
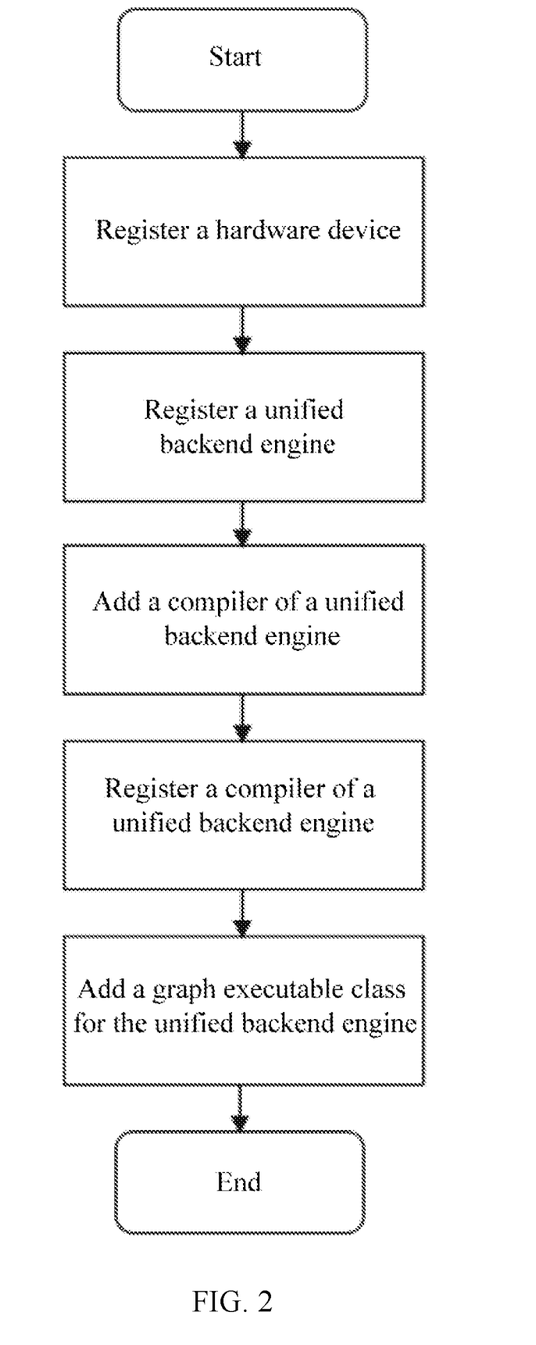
FIG. 2 is a flowchart of adding a unified backend engine to a deep learning framework/hardware device.

It needs to consider the minimum execution environment required by a backend engine in order to adding the backend engine to a deep learning framework. The simplest execution environment includes input and output, intermediate results and hardware codes for executing a specific calculation logic. The process of adding a unified backend engine to a deep learning framework is shown in FIG. 2. The specific process of adding a unified backend engine to a deep learning framework is as follows:

Step 1: A deep learning framework registers a hardware device. A device field corresponding to the hardware device is added to the source code of the deep learning framework. An enumeration type of device types for the hardware targeted by the unified backend engine is created, and device fields corresponding to the hardware, such as GPU_CUDA, DTU_TOPSDNN, etc. are added in the device type. Considering that the computational graph generated by the deep learning framework needs to be compiled and run by the unified backend engine on the specified hardware device, and the unified backend engine registers the specified hardware through its own device ID field object, the unified backend engine obtains the hardware specified by the user at the front end of the framework through the deep learning framework as follows: creating a dictionary with one-to-one mapping between the device type object specified by the user at the front end of the framework and the device ID field object of the unified backend engine. In this way, when the unified backend engine is started, it can select the type of the device ID field object according to the type of the device type object obtained from the computational graph of the front end of the framework. For example, when the device type is XrtDevice::DTU_TOPSDNN, xla::dtu::dtuPlatformID is selected for the device ID field.

Step 2: The deep learning framework registers the unified backend engine; a unified backend engine field such as XLA, TENSORRT, TVM, etc. is added to the deep learning framework.

Step 3: A compiler of the unified backend engine is added to the deep learning framework. Considering that when the unified backend engine runs an executable subgraph, it needs a compiler to compile the subgraph into the executable object corresponding to the backend engine, therefore, a compiler corresponding to the unified backend engine is added. In order to meet not only the execution performance of a compiled product, but also the universality of algorithms and high compatibility across platforms, the compiler of the unified backend engine adopts the traditional compiler route in the related art. The compiler of the unified backend engine inherits from the class of the traditional compilers and implements the corresponding compilation interface. The traditional compilers are unified compilers, and the unified compilers may adopt low level virtual machine (LLVM) compilers. The input of the compiler is the computational graph of the framework itself, which traverses every node in the subgraph in a topological order, compiles the computational graph nodes into specific executable objects in turn, and outputs them as the executable objects of the unified backend engine. In order to handle different types of operators conveniently, the compilation process of the compiler of the unified backend engine constructs two data structure types: an operator context information type of the unified backend engine and a kernel function type of the operator of the unified backend engine, which specifically includes the two following processes:

Compiling a single operator: the kernel function type of the operator of the unified backend engine is the kernel function type of the operator inherited from the framework itself, and the compilation process of a single operator is completed according to the operator type; after compiling the kernel function of the operator of the unified backend engine, the function codes, the intermediate caches, and the corresponding parameters of the input and output of the function code are output; finally, the kernel function type of the operator is registered in a kernel function factory of a corresponding operator of the unified backend engine; in order to deal with different types of operators, a factory registration mode is adopted, and this mode can be used to determine whether the engine supports a certain type of operators when the unified backend engine divides subgraphs.

Storing meta information and compilation results; the operator context information type of the unified backend engine temporarily stores meta-information and compilation results needed for compilation, and provides the necessary interface for the kernel function type of the operator; the operator context information type accepts two inputs, namely, the current computational graph nodes and all created the parameters; the function codes, intermediate caches, and the parameters corresponding to the input and output of the function code that are compiled by the kernel function type of the operator are filled into the corresponding member variables of the operator context information type.

Step 4: The deep learning framework registers the compiler of the unified backend engine; a newly added compiler is added in the unified backend engine.

Step 5: A computational graph executable object of the unified backend engine is added to the deep learning framework; a corresponding graph executable object is added for the unified backend engine, and a running interface is implemented in order to be as simple as possible, the executable object of the computational graph of the unified backend engine only contains the output, intermediate results and the arranged function call list, as well as the caches corresponding to the input and output parameters of each function.

The Second Step: Adding a Unified Backend Engine to a Hardware Device

Firstly, a new unified backend module is added in a basic software library corresponding to the hardware device, and all the newly added classes of the compiler of the unified backend engine are placed in a backend module. The backend module mainly contains two functions: first, adding a unified backend compiler for the hardware device; secondly, adding a unified backend executor to the hardware device.

Step 1: A compiler of the unified backend engine is added to the hardware device. A unified backend engine is added to the hardware device. First, the compiler of the unified backend engine is added in the basic software library corresponding to the hardware device. In a unified backend module, a new unified backend compiler class, which inherits from the low level virtual machine (LLVM) compiler class and implements a running unified backend interface, is added. The input of the running unified backend interface is the intermediate representation of the unified backend engine, and the output is an executable object of the backend engine.

Step 2: The hardware device registers the compiler of the unified backend engine. In step 1, adding the running backend interface of the unified backend engine compiler to the hardware device is realized by inheriting the low level virtual machine (LLVM) compiler class and rewriting the running backend interface of the low level virtual machine (LLVM) compiler, in which the unified backend engine selects the implementation of the unified backend compiler corresponding to the specified hardware device when executing the running backend interface: first, the unified backend engine builds a device ID field object, and then adds a new device ID field object corresponding to the specified device; at the same time, it registers the compiler class of the unified backend engine added in Step 1 to the unified backend engine through the device ID field of the unified backend engine. The above steps complete the process of the unified backend engine selecting the specified hardware device through the device ID field. When the process of registering the hardware device in the compiler of the unified backend engine is completed, after the unified backend engine is started at the compiling stage, the backend engine will choose the backend compiler corresponding to the specified hardware device, specifically, choose the implementation of the running backend interface executing the unified backend compiler corresponding to the specified hardware device.

Step 3: An executable object of the unified backend engine is added to the hardware device. The executable object generated by the compiler in Step 1 above is handed over to the unified backend engine to run, so it is necessary to add a graph executor of the unified backend engine that runs the executable object. In the unified backend module, a new executor class of the unified backend graph executable object, which inherits a graph executable class of the unified backend engine and implements an interface for running the executable object, is added. When the unified backend engine is running the executable object, it is actually executing the implementation of the interface of the running executable object of the graph executor of the unified backend engine added to the corresponding hardware device.

The Third Step: Converting a Computational Graph, a Computational Graph Compiled by the Deep Learning Framework is Converted into an Intermediate Representation of the Unified Backend Engine The deep learning framework needs the unified backend engine to compile and execute the computational graph on a specified hardware device, so a graph launcher of the unified backend engine is firstly created, and then the graph launcher is used to receive a computational graph compiled by the framework and convert it into the intermediate representation of the unified backend engine. Finally, the compiler of the unified backend engine compiles the computational graph of the intermediate representation to generate a graph executable object.

Figure 3:
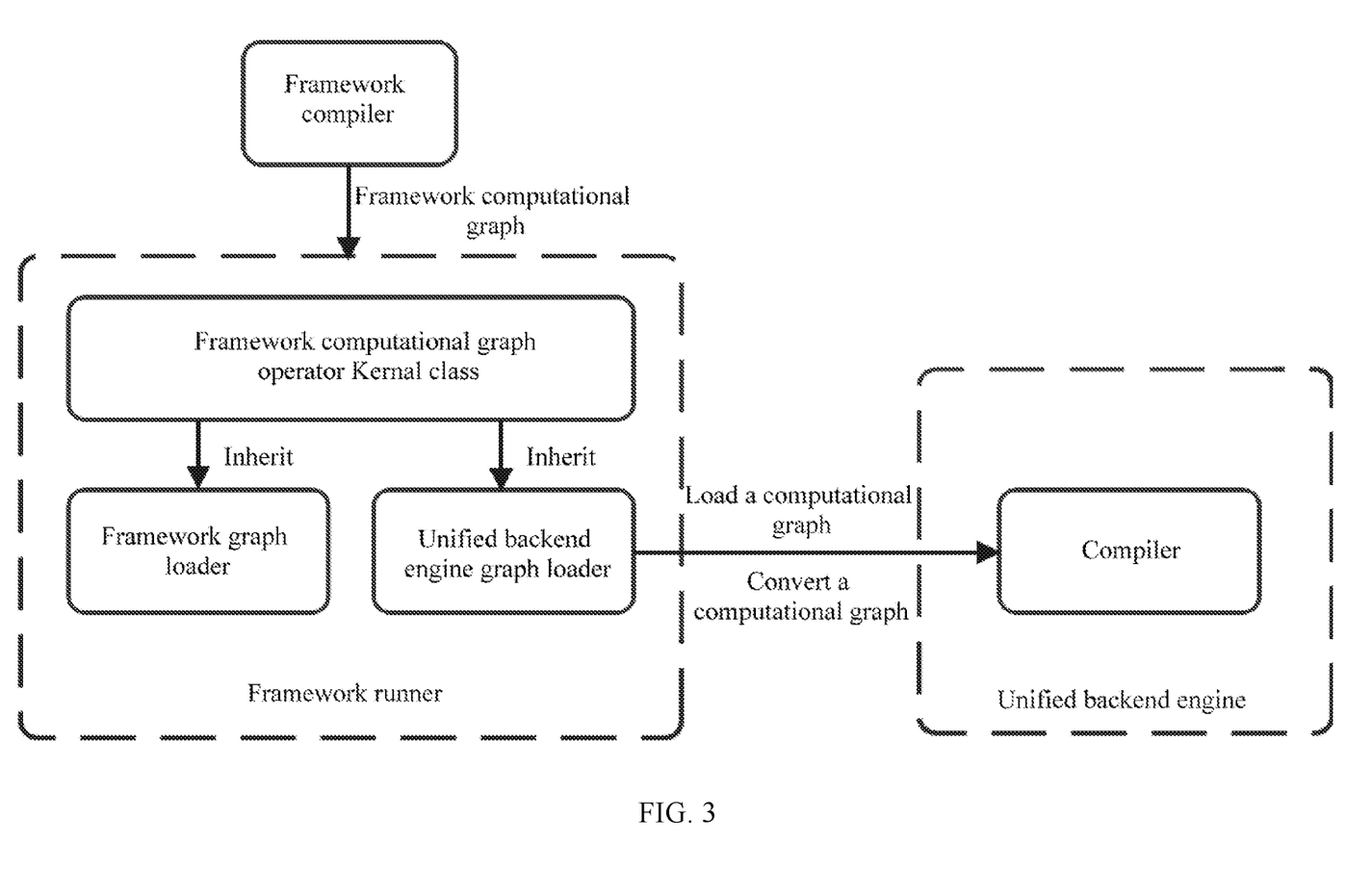
FIG. 3 is a schematic diagram of the process of constructing a graph launcher of a unified backend engine.

Step 1: A graph launcher is created for the unified backend engine. The graph launcher of the unified backend engine is added to the deep learning framework. The graph launcher inherits the kernel function of the graph operator of the framework and implements a forward propagation interface. When the graph computation enters the run-time stage, when the framework uses a runner to start running the kernel function of each operator in the computational graph, it chooses the route of compiling and running by the unified backend engine. Specifically, each operator used its own starter to start graph computation. When using the unified backend engine, each operator starts graph computation by using the graph launcher of the newly added unified backend engine and loads the calculated graph into the compiler of the unified backend engine. The process of constructing the graph launcher of the unified backend engine is shown in FIG. 3.

Step 2: The graph launcher of the unified backend engine is registered. The graph launcher of the unified backend engine has been created in Step 1, in which the method of loading the computational graph generated by the framework compilation is as follows: actually, a graph launcher type of the unified backend engine is added to the meta information of the kernel function of each operator in the computational graph received by the framework. First, a global static dictionary is created. A key value is an element of enumeration type, which lists all optional graph launcher variables. A value value is the implementation of a specific graph launcher, such as the graph launcher of the unified backend engine. Then, enumeration members of the graph launcher of the unified backend engine are added to the list of the key value of the enumeration type. When a user uses the unified backend engine, the front end of the framework will send the key value of a unified backend engine graph launcher to a registry, so the graph executor of the framework itself will choose to use the value value value of the corresponding unified backend engine graph launcher to start the graph computation process.

Step 3: The computational graph is converted to the intermediate representation of the unified backend engine. When the graph computation enters a run-time, the graph executor of the framework loads the computational graph of the framework into the backend engine through the graph launcher of the unified backend engine, and executes the forward propagation interface. A computational graph conversion interface is created in the forward propagation interface, and the computational graph conversion interface is responsible for converting the computational graph of the framework into the intermediate representation of the unified backend engine. The computational graph conversion interface firstly traverses all nodes according to a topological order of the computational graph of the framework; secondly, the intermediate representation of the corresponding unified backend engine is created for the operator in each node; finally, the computation graph of each operator kernel function is converted to generate the intermediate representation of the unified backend engine.

The Fourth Step: Compiling the Intermediate Representation, the Unified Backend Engine Compiles the Intermediate Representation on the Hardware Device to Generate an Executable Object The process of the unified backend engine compiling the intermediate representation on the hardware device to generate an executable object is as follows: firstly, the computational graph of the framework is converted into the intermediate representation of the unified backend engine, and a compilation interface for compiling the intermediate representation is added to a compilation interface of the compiler of the unified backend engine at the framework end, and the compilation interface inputs the intermediate representation; then, the compiler of the unified backend engine at the framework end transmits the intermediate representation to a running backend interface of the unified backend engine compiler of the unified backend module at the hardware device end through the compilation interface; finally, the compiler of the unified backend engine compiles the intermediate representation in the running backend interface to generate an executable object.

The Fifth Step: Running the Executable Object, the Deep Learning Framework Runs the Executable Object on the Hardware Device The process of the deep learning framework running the executable object on the hardware device is as follows: the executor of the unified backend engine at the hardware device end executes an executable object, and the executor receives the executable object generated by the compiler of the unified backend engine. Specifically, a running executable object interface of the executor runs the executable object and outputs the result of graph computation.

The Sixth Step: Memory Management of the Unified Backend Engine

First, a memory distributor class for distributing memory for the unified backend engine is created t the framework end, and a new interface to fill memory is added. The memory distributor is responsible for constructing the memory required by the backend engine at the framework end and transmitting it to the unified backend engine. The memory of an executable object generated by the unified backend engine compiler at the hardware device end contains two parts: one part is the memory of the output of the executable object; the other part is temporary memory used in intermediate calculation, so the memory distributor distributes memory to the unified backend engine in order, and the memory of the memory distributor at the framework end is applied according to the memory order required by the backend engine; secondly, the memory distributor of the framework applies for the memory according to the memory order required by the backend engine as follows: when all the hardware devices are running, the interface of the memory distributor that fills the memory copies this part of the memory of the unified backend engine to the framework according to the original memory order. Therefore, one-to-one mapping between the memory order applied by framework for the unified backend engine and the memory order of the unified backend engine is realized.

Example 2

In order to further explain the technical solution and advantages of the present disclosure, the Accelerated Linear Algebra (XLA) deep learning compiler of Tensorflow is now used as the unified backend engine. Next, the technical solution of the present disclosure will be further described in detail with the mainstream deep learning framework based on XLA docking Enflame DTU 1.0 chip as an example.

The method for fast adaptation of a mainstream deep learning framework to a DTU chip includes the following steps:

Step 1, adding a unified backend engine to a deep learning framework;

Step 2, adding a unified backend engine to a hardware device;

Step 3, converting a computational graph, the computational graph compiled and generated by the deep learning framework is converted into an intermediate representation of the unified backend engine XLA;

Step 4, compiling the intermediate representation, the unified backend engine XLA compiles the intermediate representation on the DTU chip to generate an executable object;

Step 5, running the executable object, the deep learning framework running the executable object on the DTU chip;

Step 6, managing memory of the unified backend engine XLA.

The process of adding the unified backend engine XLA to the deep learning framework in Step 1 is as follows: considering that the unified backend engine XLA compiles the intermediate representation on the DTU chip to generate an executable object, in order to add a new backend engine XLA, only one XLA backend executable object and a compiler class that compiles the framework subgraph into a corresponding XLA backend executable object need to be added. The specific process of adding a unified backend engine to the deep learning framework is as follows: adding an XLA backend engine to the deep learning framework needs to consider the minimum execution environment required by the backend engine, and the simplest execution environment includes input and output, intermediate results and hardware codes for executing a specific calculation logic.

Step 1: The deep learning framework registers the DTU chip. A hardware device field corresponding to DTU chip is added to the source code of the deep learning framework. An enumeration type of hardware devices that can support XLA backend for the hardware targeted by the unified backend engine XLA is created, and a device field DTU_TOPSDNN corresponding to the hardware is added in this enumeration type. Considering that the computational graph generated by the deep learning framework needs the unified backend engine to compile and run on the DTU chip, and the unified backend engine XLA registers the specified hardware through its own device ID field object, the method for the unified backend engine XLA to obtain the DTU chip hardware specified by the user at the front end of the framework through the deep learning framework is as follows: constructing a dictionary with one-to-one mapping between the hardware type object specified by the front end of the framework and the device ID field object of the unified backend engine. In this way, when the unified backend engine is started, the type of device ID field object can be selected according to the type of hardware device object that can support XLA backend obtained from the computational graph of the front end of the framework. For example, when the type of hardware device object is xlaDevice::DTU_TOPSDNN, xla::dtu::dtuPlatformID can be selected for the type of device ID field object.

Step 2: The deep learning framework registers the unified backend engine. A unified backend engine field XLA is added to the deep learning framework.

Step 3: A compiler of the unified backend engine is added to the deep learning framework. Considering that when the unified backend engine runs a sub-graph of an XLA backend executable object, it needs a compiler to compile the sub-graph into an executable object corresponding to the backend engine. Therefore, a compiler corresponding to the XLA backend executable object is added. In order to meet not only the execution performance of compiled products, but also the universality of algorithms and high compatibility across platforms, the compiler of the unified backend engine adopts the traditional compiler route of a low level virtual machine (LLVM) compiler, which inherits from the low level virtual machine (LLVM) compiler class and implements the corresponding compilation interface. The input of the compiler is the computational graph compiled by the framework's own compiler, which traverses every node in the subgraph in a topological order, compiles the computational graph nodes into concrete executable objects in turn, and outputs them as the executable objects of the unified backend engine. In order to handle different types of operators conveniently, the compilation process of the compiler of the unified backend engine constructs two data structure types: an operator context information type of the unified backend engine and a kernel function type of the operator of the unified backend engine, which specifically includes the two following processes:

Compiling a single operator: the kernel function type of the operator of the unified backend engine XLA is the kernel function type of the operator inherited from the framework itself, the compilation process of a single operator is completed according to the operator type, the kernel function of the operator of the unified backend engine XLA is compiled to generate function codes, intermediate caches, and parameters corresponding to the input and output of the function codes, the kernel function type of the operator is registered in a kernel function factory of a corresponding operator to the unified backend engine XLA, and a factory registration mode is adopted so that the backend engine can judge whether the engine supports a certain type of operator when dividing subgraphs;

Storing meta-information and compilation results: the operator context information type of the unified backend engine XLA temporarily stores meta-information and compilation results required by compilation, and provides necessary interfaces for the kernel function type of the operator, the operator context information type accepts two inputs, namely, currently computational graph nodes and all created parameters, and fills the function codes, intermediate caches, and the parameters corresponding to the input and output of the function codes generated by compiling the kernel function type of the operator into corresponding member variables of the operator context information type.

Step 4: The deep learning framework registers the compiler of the unified backend engine XLA; a newly added compiler is added in the unified backend engine XLA.

Step 5: A computational graph executable object of the unified backend engine is added to the deep learning framework; a corresponding graph executable object is added for the unified backend engine XLA, and a running interface is implemented in order to be as simple as possible, the executable object of the computational graph of the unified backend engine only contains the output, intermediate results and the arranged function call list, as well as the caches corresponding to the input and output parameters of each function.

The process of adding the unified backend engine to the hardware device in the second step is as follows: the process of adding the unified backend engine to the hardware device DTU chip is mainly to inherit the classes associated with the compiler in the unified backend engine. Firstly, a new unified backend module is added in a basic software library corresponding to the hardware device, and all the newly added classes of the compiler of the unified backend engine are placed in a backend module. The backend module mainly contains two functions: first, adding a unified backend compiler for the hardware device; secondly, adding a unified backend executor to the hardware device.

Step 1: A compiler of the unified backend engine is added to the hardware device. A unified backend engine is added to the hardware device. First, the compiler of the unified backend engine is added in the basic software library corresponding to the hardware device. In a unified backend module, a new compiler class of DTU, which inherits from the low level virtual machine (LLVM) compiler class and implements a running unified backend interface, is added. The input of the running unified backend interface is the intermediate representation of the unified backend engine, and the output is an executable object of the backend engine.

Step 2: The hardware device registers the compiler of the unified backend engine. In step 1, adding the running backend interface of the unified backend engine compiler to the hardware device is realized by inheriting the low level virtual machine (LLVM) compiler class and rewriting the running backend interface of the low level virtual machine (LLVM) compiler, in which the unified backend engine selects the implementation of the DTU compiler corresponding to the specified hardware device when executing the running backend interface: first, the unified backend engine builds a device ID field object, and then adds a new device ID field object corresponding to the specified device; at the same time, it registers the compiler class of the unified backend engine added in Step 1 to the unified backend engine through a DTU device ID field object type. The above steps complete the process of the unified backend engine selecting the specified hardware device through the DTU device ID field object. When the process of registering the hardware device in the compiler of the unified backend engine is completed, after the unified backend engine is started at the compiling stage, the backend engine will choose the backend compiler corresponding to the specified hardware device, specifically, choose the implementation of the running backend interface executing the unified backend compiler corresponding to the specified hardware device DTU.

Step 3: An executable object of the unified backend engine is added to the hardware device. The executable object generated by the compiler in Step 1 above is handed over to the unified backend engine to run, so it is necessary to add a graph executor of the unified backend engine that runs the executable object. In the unified backend module, a new executor class of the unified backend graph executable object, which inherits a graph executable class of the unified backend engine and implements an interface for running the executable object, is added. When the unified backend engine is running the executable object, it is actually executing the implementation of the interface of the running executable object of the graph executor of the unified backend engine added to the corresponding hardware device.

In the third step, the process of converting the computational graph generated by the compilation of the deep learning framework into the intermediate representation of the unified backend engine is as follows: without using the unified backend engine, the execution of the computational graph in the deep learning framework is driven by the code during the runtime of the framework itself; considering that the unified backend engine is used to connect the source code of the deep learning framework with the underlying software of the hardware device, the computational graph of the framework is converted into an intermediate representation of the unified backend engine, and the intermediate representation can be directly compiled into the executable code of a target platform by the unified backend engine and can be directly executed without the participation of the code during the runtime of the framework itself.

Each deep learning framework itself has a runner that executes the kernel of each operator in the computational graph. At the same time, the kernel function type of the operator in the computational graph has a starter that starts its own calculation. When graph computation enters the runtime, the graph runner is responsible for running the kernel of each operator in the framework computation graph, each operator uses its own starter to start graph computation. Considering that the deep learning framework needs to compile and execute the computational graph on the specified hardware device through the unified backend engine, a graph launcher of the unified backend engine is first created, and then the graph launcher is used to receive the computational graph compiled by the framework and convert it into an intermediate representation of the unified backend engine. Finally, the compiler of the unified backend engine compiles the computational graph of the intermediate representation to generate a graph executable object.

Step 1: A graph launcher is created for the unified backend engine. The graph launcher of the unified backend engine is added to the deep learning framework. The graph launcher inherits the kernel function of the graph operator of the framework and implements a forward propagation interface. When the graph computation enters the run-time stage, when the framework uses a runner to start running the kernel function of each operator kernel in the computational graph, it chooses the route of compiling and running by the unified backend engine. Specifically, each operator used its own starter to start graph computation. When using the unified backend engine, each operator starts graph computation by using the graph launcher of the newly added unified backend engine and loads the calculated graph into the compiler of the unified backend engine.

The process of constructing the graph launcher of the unified backend engine is shown in FIG. 3.

Step 2: The graph launcher of the unified backend engine is registered. The graph launcher of the unified backend engine has been created in Step 1, in which the method of loading the computational graph generated by the framework compilation is as follows: actually, a graph launcher type of the unified backend engine is added to the meta information of the kernel function of each operator in the computational graph received by the framework. First, a global static dictionary is created. A key value is an element of enumeration type, which lists all optional graph launcher variables. A value value is the implementation of a specific graph launcher, such as the graph launcher of the unified backend engine. Then, enumeration members of the graph launcher of the unified backend engine are added to the list of the key value of the enumeration type. When a user uses the unified backend engine, the front end of the framework will send the key value of a unified backend engine graph launcher to a registry, so the graph executor of the framework itself will choose to use the value value of the corresponding unified backend engine graph launcher to start the graph computation process.

Step 3: The computational graph is converted to the intermediate representation of the unified backend engine. When the graph computation enters a run-time, the graph executor of the framework loads the computational graph of the framework into the backend engine through the graph launcher of the unified backend engine, and executes the forward propagation interface. A computational graph conversion interface is created in the forward propagation interface, and the computational graph conversion interface is responsible for converting the computational graph of the framework into the intermediate representation of the unified backend engine. The computational graph conversion interface firstly traverses all nodes according to a topological order of the computational graph of the framework; secondly, the intermediate representation of the corresponding unified backend engine is created for the operator in each node; finally, the computation graph of each operator kernel function is converted to generate the intermediate representation of the unified backend engine.

In the fourth step of compiling the intermediate representation, the process of the unified backend engine compiling the intermediate representation on the hardware device to generate an executable object is as follows: firstly, the computational graph of the framework is converted into the intermediate representation of the unified backend engine, and a compilation interface for compiling the intermediate representation is added to a compilation interface of the compiler of the unified backend engine at the framework end, and the compilation interface inputs the intermediate representation; then, the compiler of the unified backend engine at the framework end transmits the intermediate representation to a running backend interface of the unified backend engine compiler of the unified backend module at the hardware device end through the compilation interface; finally, the compiler of the unified backend engine compiles the intermediate representation in the running backend interface to generate an executable object.

In the fifth step of running the executable object, the process of the deep learning framework running the executable object on the hardware device is as follows: the executor of the unified backend engine at the hardware device end executes an executable object, and the executor receives the executable object generated by the compiler of the unified backend engine. Specifically, a running executable object interface of the executor runs the executable object and outputs the result of graph computation.

In the sixth step, the process of memory management of the unified backend engine is as follows: the unified backend engine needs to distribute memory at runtime. The memory distribution method is as follows: First, a memory distributor class for distributing memory for the unified backend engine is created t the framework end, and a new interface to fill memory is added. The memory distributor is responsible for constructing the memory required by the backend engine at the framework end and transmitting it to the unified backend engine. The memory of an executable object generated by the unified backend engine compiler at the hardware device end contains two parts: one part is the memory of the output of the executable object; the other part is temporary memory used in intermediate calculation, so the memory distributor distributes memory to the unified backend engine in order, and the memory of the memory distributor at the framework end is applied according to the memory order required by the backend engine; secondly, the memory distributor of the framework applies for the memory according to the memory order required by the backend engine as follows: when all the hardware devices are running, the interface of the memory distributor that fills the memory copies this part of the memory of the unified backend engine to the framework according to the original memory order. Therefore, one-to-one mapping between the memory order applied by framework for the unified backend engine and the memory order of the unified backend engine is realized.

Through the above steps, the whole process of interfacing the mainstream deep learning framework with the Enflame DTU 1.0 chip based on XLA has been completed. Next, the interfaced deep learning framework is used to test the compatibility of a single operator test on the Enflame DTU 1.0 chip.

Figure 4:
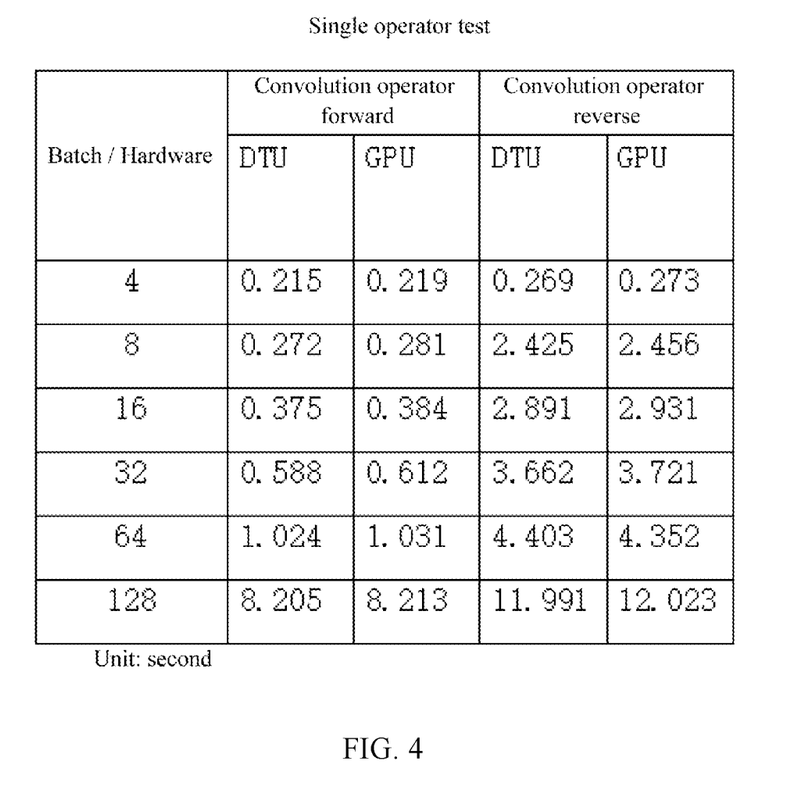
FIG. 4 shows the single operator compatibility test results.

Using the interfaced deep learning framework, the convolution operators of different batches of batch size are run in the forward and reverse directions on the original DTU 1.0 chip respectively, and the mainstream AI hardware device GPU is selected as a comparison. The shape of a single operator test input tensor is 224×224, and the number of channels is 3. The test results are shown in FIG. 4.

The test results show that compared with GPU, the average error range of DTU is 10e-3, and the running speed of DTU is slightly faster than that of GPU. Therefore, the deep learning framework based on XLA technology route interfacing has good compatibility with the Enflame DTU 1.0 chip.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above description is only the preferred embodiment of the present disclosure, and is not intended to limit the present disclosure. Any modification, equivalent replacement or improvement within the spirit and principle of the present disclosure should be included in the scope of protection of the present disclosure.

What is claimed is:

1. A method for adapting a deep learning framework to a hardware device based on a unified backend engine, comprising the following steps:
   S1: adding the unified backend engine to the deep learning framework;
   S2: adding the unified backend engine to the hardware device;
   S3: converting a computational graph, wherein the computational graph compiled and generated by the deep learning framework is converted into an intermediate representation of the unified backend engine, which comprises the following substeps:
   S31: creating a graph launcher of the unified backend engine, and adding the graph launcher of the unified backend engine to the deep learning framework, wherein
   the graph launcher inherits from operators of the computational graph of the framework and realizes a forward propagation interface, when the graph computation enters a run-time stage, the framework selects a route compiled and run by the unified backend engine when starting to run a kernel function of each operator in the computational graph by a runner;
   S32: registering the graph launcher of the unified backend engine, and using the graph launcher to receive the computational graph compiled and generated by the framework, which comprises:
   S321: creating a global static dictionary, wherein a key value is an element of an enumeration type, listing all optional graph launcher variables, wherein a value value is to implement the graph launcher;
   S322: adding enumeration members of the graph launcher of the unified backend engine to a key value list of the enumeration type;
   S323: transmitting a key value of the graph launcher of the unified backend engine to a registry by means of a front end of the framework by using the unified backend engine, and a graph executor of the computational graph of the framework choosing to use a corresponding value value of the graph launcher of the unified backend engine to start a graph computation process;

S33: converting the computational graph into the intermediate representation of the unified backend engine, which comprises the following substeps:

S331: the graph executor of the framework loading a computational graph of the framework into the backend engine through the graph launcher of the unified backend engine and executing the forward propagation interface when the graph computation enters a running period;

S332: creating a computational graph conversion interface in the forward propagation interface, wherein the computational graph conversion interface is responsible for converting the computational graph of the framework into the intermediate representation of the unified backend engine;

S333: the computational graph conversion interface first traversing all nodes of the computational graph according to a topological order of the computational graph of the framework, then creating the corresponding intermediate representation of the unified backend engine for operators of each node, and finally, performing the computational graph conversion of the kernel function of each operator to generate the intermediate representation of the unified backend engine;

S4: compiling the intermediate representation, wherein the unified backend engine compiles the intermediate representation on the hardware device to generate an executable object;

S5: running the executable object, wherein the deep learning framework runs the executable object on the hardware device;

S6: managing memory of the unified backend engine.

2. The method for adapting a deep learning framework to a hardware device based on a unified backend engine according to claim 1, wherein the step S1 comprises the following substeps:

S11: the deep learning framework registering the hardware device, adding a device field corresponding to the hardware device to a source code of the deep learning framework, creating an enumeration type of a device type for a hardware targeted by the unified backend engine, and adding the device field corresponding to the hardware in the device type;

S12: the deep learning framework registering the unified backend engine and adding a unified backend engine field to the deep learning framework;

S13: adding a compiler of the unified backend engine to the deep learning framework;

S14: the deep learning framework registering the compiler of the unified backend engine, and registering the newly added compiler in the unified backend engine;

S15: adding a computational graph executable object of the unified backend engine to the deep learning framework, adding a corresponding computational graph executable object for the unified backend engine, and implementing a running interface.

3. The method for adapting a deep learning framework to a hardware device based on a unified backend engine according to claim 2, wherein in order to enable the computational graph generated by the deep learning framework to be compiled and run on a specified hardware device registered by the unified backend engine through a device field object of the specified hardware device, the unified backend engine must acquire the hardware specified by a user at a front end of the framework through the deep learning framework by means of constructing a dictionary in which a hardware type object specified by the user at the front end of the framework and a device ID field object of the unified backend engine are mapped one by one.

4. The method for adapting a deep learning framework to a hardware device based on a unified backend engine according to claim 2, wherein in the step S13, the compiler of the unified backend engine inherits from unified compilers and implements a corresponding compilation interface; an input of the compiler of the unified backend engine is the computational graph of the framework, each node in a subgraph is traversed in a topological order, and a node of the computational graph is sequentially compiled into a specific executable object to be output as the executable object of the unified backend engine.

5. The method for adapting a deep learning framework to a hardware device based on a unified backend engine according to claim 2, wherein the compiler of the unified backend engine comprises a following step such that different types of operators are processed: constructing two data structure types, namely, an operator context information type of the unified backend engine and a kernel function type of an operator of the unified backend engine, which comprises:

compiling a single operator, wherein the kernel function type of the operator of the unified backend engine is inherited from the computational graph of the framework, the compilation process of a single operator is completed according to a type of the operator, the kernel function of the operator of the unified backend engine is compiled to generate function codes, intermediate caches, and parameters corresponding to input and output of the function codes, the kernel function type of the operator is registered in a kernel function factory of a corresponding operator to the unified backend engine, and a factory registration mode is adopted so that the backend engine can judge whether the engine supports a certain type of operator when dividing subgraphs;

storing meta-information and compilation results, wherein the operator context information type of the unified backend engine temporarily stores meta-information and compilation results required by compilation, and provides necessary interfaces for the kernel function type of the operator, the operator context information type accepts two inputs, namely, currently computational graph nodes and all created parameters, and fills the function codes, the intermediate caches, and the parameters corresponding to the input and output of the function codes generated by compiling the kernel function type of the operator into corresponding member variables of the operator context information type.

6. The method for adapting a deep learning framework to a hardware device based on a unified backend engine according to claim 1, wherein the step S2 comprises the following substeps:

S21: adding a compiler of the unified backend engine to the hardware device, adding the unified backend engine to the hardware device, and adding the compiler of the unified backend engine to a basic software library corresponding to the hardware device;

S22: the hardware device registering the compiler of the unified backend engine;

S23: adding the executable object of the unified backend engine to the hardware device.

7. The method for adapting a deep learning framework to a hardware device based on a unified backend engine according to claim 1, wherein the step S4 comprises the following substeps:
- S41: converting the computational graph of the framework into the intermediate representation of the unified backend engine, and adding a compilation interface for compiling the intermediate representation to a compilation interface of a compiler of the unified backend engine at a framework end, and the compilation interface inputting the intermediate representation;
- S42: the compiler of the unified backend engine at the framework end transmitting the intermediate representation to a running backend interface of the compiler of the unified backend engine at the hardware device end through the compilation interface;
- S43: the compiler of the unified backend engine compiling the intermediate representation in the running backend interface to generate the executable object.

8. The method for adapting a deep learning framework to a hardware device based on a unified backend engine according to claim 1, wherein the step of the deep learning framework running the executable object on the hardware device in the step S5 is as follows: an executor of the unified backend engine on the hardware device receiving the executable object generated by a compiler of the unified backend engine, then running the executable object by the executor, and outputting a result of graph computation.

9. The method for adapting a deep learning framework to a hardware device based on a unified backend engine according to claim 1, wherein the specific steps of memory distribution in the step S6 are as follows:
- S61: creating a memory distributor for distributing a memory for the unified backend engine at a framework end, and adding an interface for filling the memory, wherein the memory distributor is responsible for constructing the memory required by the backend engine at the framework end and transmitting the memory to the unified backend engine;
- S62: applying the memory of the memory distributor at the framework end according to a memory order required by the backend engine, and the interface of the memory distributor for filling the memory copying the memory of the unified backend engine to the framework end according to an original memory order when the hardware device finishes running, so as to implement one-to-one mapping between a memory order applied by the framework for the unified backend engine and the memory order required by the unified backend engine.

* * * * *